United States Patent Office 3,522,159
Patented July 28, 1970

3,522,159
METHOD FOR ACCELERATING THE CURING BY IONIZING RADIATIONS OF AMINO-FORMALDEHYDE RESIN COATING FILMS AND/OR AMINO-FORMALDEHYDE-ALKYD RESIN COATING FILMS
Koji Ohdan, Hiratsuka-shi, Japan, assignor to Kansai Paint Company, Limited, Kanzaki, Amagasaki - shi, Hyogo-ken, Japan
No Drawing. Filed Sept. 13, 1965, Ser. No. 487,067
Claims priority, application Japan, Sept. 18, 1964, 39/53,035
Int. Cl. C08f 27/02, 1/16
U.S. Cl. 204—159.18           6 Claims

ABSTRACT OF THE DISCLOSURE

A method for accelerating the curing of amino-formaldehyde resin coating films or amino-formaldehyde-alkyd resin coating films by ionizing radiation, which comprises admixing an amino-formaldehyde resin, such as urea-formaldehyde resin, melamine-formaldehyde resin or amino-formaldehyde-alkyd resin with chlorinated hydrocarbons, such as carbon tetrachloride and hexachloroethane, which are soluble in said amino-formaldehyde resin or amino-formaldehyde-alkyd resin and thereafter subjecting the mixture to irradiation with ionizing radiations.

---

This invention relates to a method for accelerating the curing by ionizing radiations of amino-formaldehyde resin coating films and/or amino-formaldehyde-alkyd resin coating films.

The term "amino-formaldehyde resin" referred to herein denotes compounds having active amino groups such as urea, thiourea, melamine, benzoguanamine and the like and condensed with suitable aldehydes such as for example formaldehyde, and further includes such compounds having their methylol groups etherified in part or whole with alcohols such as for example n-butyl alcohol, methyl alcohol and the like. In the broad sense of the term, the amino-formaldehyde resin according to the invention also includes those polymers synthesized from ethylenically unsaturated monomers having active amino groups such as for example acrylamide alone or together with other ethylenically unsaturated monomers and having formaldehyde added to their amino groups to introduce methylol groups or these methylol groups being further etherified with alcohol.

The term "amino-formaldehyde-alkyd resin" herein referred to designates the above amino-formaldehyde resins mixed or reacted with alkyd resins.

The amino-formaldehyde resin coating or amino-formaldehyde-alkyd resin coating according to the invention is a liquid solution resulting from addition of a suitable solvent to these resins of a further dispersion resulting from addition of a suitable pigment thereto.

The ionizing radiation denotes electromagnetic radiations such as gamma-rays and X-rays and corpuscular radiations such as of electrons, neutrons and deuterons.

The curing of such amino-formaldehyde-alkyd resin coating films has hitherto relied upon high-temperature heating of such coatings applied onto a substrate. This curing method is handicapped in that it requires considerable length of time to achieve the desired curing. This is more so with large-scale coating plants where steel strips are coated continuously and at high speed, with the result that huge heat-treatment equipment is required. Such curing method would be impractical where the substrates are wood or plastic susceptible to deterioration or deformation at high temperatures, and therefore is limited in application to coatings applied on metallic surfaces.

Another method known for curing the amino-formaldehyde-alkyd resin coating films comprises the use of acidic curing reagents such as hydrochloric acid, para-toluene-sulfonic acid and the like which is previously incorporated into the resin coating composition. This method permits of the curing of the coating on a substrate at room temperature. However, it is limited in application to those amino-formaldehyde-alkyd resins which essentially comprise urea-formaldehyde resin components. The speed of curing by such method is relatively low. The most critical of all disadvantages of this curing method using acidic curing reagents is that the coating composition containing a curing reagent tends to cure quickly while placed in a container, so that such acidic type curing reagents should be added to the coating composition just before it is applied to a substrate, and further that there will be the problem of acidic corrosion encountered with the coating equipment.

To eliminate or alleviate the above-noted drawbacks of the conventional curing methods, there have been later introduced some methods in which the curing is done by applying to a coating film certain high-density radiations such as electron beams which may be obtained by an accelerator. Reference may be made in this connection to Fred L. Keck's report published in the 1958 "Official Digest, Federation Paint and Varnish Production Clubs," vol. 30, pages 989–1025, in which he revealed the effect of irradiation with electron beams applied to melamine-formaldehyde-alkyd resin coating films during the heat treatment thereof. However, nothing has ever been shown to prove that amino-formaldehyde-alkyd resin coating films are readily curable by irradiation with electron beams alone.

It is well known that most of the radiation energy such as of electron beam is transformed ultimately into thermal energy in the material which irradiated with the ionizing radiation. This fact permits the assumption that amino-formaldehyde-alkyd resin coating films may be cured by irradiation of satisfactorily large quantities of radiations. However, if the assumption is to be materialized, the equipment for such process will be gigantic. Therefore, it is advisable to reduce the irradiation time required for the curing of the coating film; in other words, a particular device would be required in the preparation of coating compositions which can be cured with a minimum of dose.

One of the advantages of applying ionizing radiations of suitable energy for curing of a coating film is that the effect of irradiation may be localized. This is possible with electromagnetic type radiations such as X-rays by adjusting their energy, and it is more so with charged particles like electron beams. Since such charged particles present a certain range of penetration within a material, their energy may be adjusted so that the range of their flight is substantially equal to the thickness of the film. This allows the whole or greater portion of the radiation energy to be absorbed by the layer of the film without developing any heat in the substrate. It is thus made possible to form a cured film of a heat curing type material upon the surface of a wood, leather, plastic, paper or the like which is susceptible to deformation or deterioration when exposed to high temperature atmosphere for extended periods of time. However, the merits of the curing with ionizing radiations are offset if the dose increases and hence the time for irradiation increases, resulting in an increase in the amount of heat transmitted from the film to the substrate. For this reason, it is desirable to hold the dose of radiations to a minimum.

The inventor has tried various ways of minimizing the dose required for effecting the curing of resin coating films in consideration of the above, and has discovered that the use of chlorinated hydrocarbons compatible with or soluble in amino-formaldehyde resin or amino-formaldehyde-alkyd resin coatings will greatly reduce the dose required for curing the unit area of the coating film. These chlorinated hydrocarbons may be incorporated into the starting coating composition and applied to a given substrate followed by irradiation with electron beams.

The behaviour of such chlorinated hydrocarbons incorporated in an amino-formaldehyde resin is most likely such that the C—Cl bonds are ruptured by the ionizing radiations thereby developing chlorine atoms which tend to form hydrogen chloride by abstracting hydrogen atoms from amino-formaldehyde resin molecules consisting as functional component of —$CH_2OH$ groups or —$CH_2OR$ groups (where R represents alkyl groups such as n-butyl, ethyl or methyl groups). The resulting hydrogen chloride is believed to behave as an acidic catalyst acting upon the amino-formaldehyde resin.

It has been actually verified that irradiation with gamma rays of melamine-formaldehyde resin or many other organic compounds in the presence of various chlorine compounds results in the formation of considerable amounts of acid.

Table 1 below shows the amounts of acidic components quantitatively determined from the mixtures of chlorinated hydrocarbons and organic compounds, 20 parts and 80 parts by weight respectively, which were irradiated at 20° C. with cobalt-60 gamma rays at a dose rate of $3.5 \times 10^4$ roentgen per hour and to a total absorption dose of 0.2 megarad and which were thereafter subjected to titration with 1/50 N-alcoholic potassium hydroxide solution.

Table 2 shows the results of similar experiments using 2 parts by weight of chlorinated hydrocarbons and 98 parts by weight of other organic compounds. The numerical figures for the amount of acid generated both in Table 1 and Table 2 are milligram equivalents per mole of non-chlorine containing organic compounds in each sample.

TABLE 1

| Chlorinated hydrocarbons | Organic compounds | Acid generated |
|---|---|---|
| Carbon tetrachloride | N-butyl alcohol | 3.9 |
| Do | Tetrahydrofuran | 23 |
| Hexachloroethane | do | 69 |
| Do | Benzene | 0.12 |
| Do | N-butyl acetate | 0.7 |
| 1,1,2,2-tetrachloroethane | Tetrahydrofuran | 1.8 |
| Trichloroethylene | do | 0.8 |
| Benzene hexachloride | do | 0.4 |

TABLE 2

| Chlorinated hydrocarbons | Organic compounds | Acid generated |
|---|---|---|
| Carbon tetrachloride | Isopropyl alcohol | 9.0 |
| Hexachloroethane | do | 5.1 |
| Do | Sec-butyl alcohol | 1.1 |
| Do | Methyl isobutyl ketone | 2.0 |

It is thus apparent that irradiation with some ionizing radiations to organic compounds containing chlorinated hydrocarbons results in the formation of considerable amounts of free acid. It follows that the fact that the curing of amino-formaldehyde resin coating films containing a certain chlorinated hydrocarbon is accelerated by irradiating with ionizing radiations may be attributed to the resulting hydrogen chloride.

According, the inventor contemplates the use of such chlorinated hydrocarbons which generate free chlorine atoms capable of abstracting hydrogen atoms from themselves or from coexisting compounds when subjected to irradiation with ionizing radiations, said chlorinated hydrocarbons being further compatible with or soluble in amino-formaldehyde resins.

The chlorinated hydrocarbons according to the present invention should preferably be solid at room temperature and have a relatively low vapor pressure such as hexachloroethane which is less sacrificed by evaporation from the coating composition prior to and during irradiation with ionizing radiations.

It is to be noted that the hydrogen chloride formed by irradiating an amino-formaldehyde resin having been incorporated therein a suitable chlorinated hydrocarbon is one large factor conducive to accelerated curing of the resin, while the energy of the radiations changes into the thermal energy thereby increasing the temperature of the resin which adds to another important factor of accelerating the curing. Thus, these two factors work together toward effective curing of the resin coating films according to the invention.

It will be appreciated that such acceleration effect may be further improved by applying a heat treatment to the thus irradiated resin coating for only a limited length of time in the usual manner, whereby the catalytic action of the resulting free hydrochloric acid becomes more pronounced.

It will be also appreciated that any of the listed chlorinated hydrocarbons remains ineffective for the curing of the amino-formaldehyde resin until it is subjected to irradiation with ionizing radiations. Therefore, there is no fear of the resin coating containing such chlorinated hydrocarbons being gelled or cured while placed in the container. Thus, the present invention can completely eliminate the problem of storability or pot life involved in the case where acidic curing reagents are used.

Another advantage of the curing method according to the invention resides in the fact that it is possible to obtain a wrinkle-free, flat and smooth surface curing of the resin coating though this should contain large quantities of alkyd resin components modified by a drying oil such as dehydrated castor oil which has lots of conjugated double bonds.

The invention will now be more fully described in connection with some of its typical embodiments exemplified below.

EXAMPLE 1

70 parts of alkyd resin varnish modified with dehydrated castor oil (oil length 40%) were mixed with 30 parts of n-butyl etherified melamine-formaldehyde resin varnish. Note that the parts are referred to by weight of non-volatile matter in the varnish throughout all of the following examples. The thus mixed amino-formaldehyde-alkyd resin varnish was applied to a glass plate to a film thickness of about 6 mg./cm.$^2$ (based on the resin). The resulting resin film was irradiated with electron beams of 1.5 mev. energy at a current density of about 0.6 $\mu$a./cm.$^2$ for 120 seconds.

The irradiated film was not cured sufficiently at this stage, the degree of hardness being 5 by Sward Rocker value according to the method specified under "General Testing Method for Coatings" of Japanese Industrial Standards JIS K 5400.

To 100 parts of the above blended varnish were added 10 parts of hexachloroethane in 30% toluene solution. This mixture was similarly applied to form a film which was irradiated under similar conditions. The rate of curing in this case was 20 by Sward Rocker value. The same curing value was obtained even when the addition of hexachloroethane was reduced to 2 parts. The lower limit of Sward Rocker value of amino-formaldehyde-alkyd resin varnish according to JIS K 5651 is specified at 13.

EXAMPLE 2

75 parts of alkyd resin varnish modified with coconut oil (oil length 30%) were blended with 25 parts of n-butyl etherified melamine-formaldehyde resin varnish similar to that used in Example 1. The blended varnish with and without addition thereto of 10 parts of hexachloroethane was subjected to irradiation with electron beams under the same conditions as noted in Example 1. The Sward Rocker value of the varnish without hexachloroethane was only 9, while that of the varnish with hexachloroethane was 14.

EXAMPLE 3

60 parts of alkyd resin varnish modified with dehydrated castor oil (oil length 30%) were blended with 40 parts of n-butyl etherified urea-formaldehyde resin varnish. The blended varnish with and without addition thereto 10 parts of hexachloroethane was subjected to irradiation with electron beams under the same conditions as noted in Example 1. The Sward Rocker value of the varnish without hexachloroethane was only 6, while that of the varnish having incorporated therein hexachloroethane was 16.

EXAMPLE 4

An amino formaldehyde-alkyd resin varnish was prepared by blending 70 parts of alkyd resin varnish modified with coconut oil similar to that used in Example 2 with 30 parts of n-butyl etherified urea-formaldehyde resin varnish similar to that used in Example 3. The blended varnish with and without addition thereto of 10 parts of hexachloroethane was subjected to irradiation with electron beams under similar conditions to those noted in Example 1. The Sward Rocker value of the varnish without hexachloroethane was only 9, while that of the varnish with hexachloroethane was 13.

EXAMPLE 5

To 100 parts of resin content of the amino-formaldehyde-alkyd resin varnish used in Example 1 were added 20 parts of hexachloroethane. This varnish was applied to two separate plates of glass in the manner described in Example 1. One of these two glass plates was irradiated at 20° C. with cobalt-60 gamma rays at a dose rate of $2.2 \times 10^4$ roentgens per hour and to a total absorption dose of 2 megarads. These two plates coated with the varnish containing hexachloroethane were subjected to heat treatment at 120° C. for about 10 minutes together with another pair of plates, one of which being coated with a varnish without hexachloroethane and the other being coated with a similar hexachloroethane free varnish but irradiated with gamma rays. The Sward Rocker value of each of these different samples is illustrated below.

| Sample | Without irradiation | With irradiation |
|---|---|---|
| Resin varnish without hexachloroethane | 3 | 11 |
| Resin varnish with hexachloroethane | 6 | 15 |

EXAMPLE 6

Two resin varnish samples were prepared, one being a mixture of 70 parts of alkyd resin varnish modified with soybean oil (oil length 39%) and 20 parts of n-butyl etherified melamine-formaldehyde resin varnish similar to that used in Example 1, and the other being said varnish mixture further added with 20 parts of hexachloroethane. There were prepared two glass plates for coating with each of the above two varnish samples. One each of the two different sets of coated plates was irradiated at 20° C. with cobalt-60 gamma rays at a dose rate of $2.2 \times 10^4$ roentgens per hour and to a total absorption dose of 2 megarads. These two irradiated plates together with the other two non-irradiated coated plates were subjected to heat treatment at 140° C. for 10 minutes, with the Sward Rocker values of the four different samples reading as follows:

| Sample | Without irradiation | With irradiation |
|---|---|---|
| Resin varnish without hexachloroethane | 12 | 21 |
| Resin varnish with hexachloroethane | 12 | 27 |

EXAMPLE 7

Two glass plates were prepared for coating to a thickness of about 6 mg./cm.$^2$ after evaporation of the solvent with n-butyl etherified urea-formaldehyde resin varnish similar to those used in Examples 3 and 4 with and without addition thereto of 20 parts of hexachloroethane for 100 parts of resin content in the varnish, respectively. These coatings on the glass plates were similarly irradiated at 20° C. with cobalt-60 gamma rays at a dose rate of $3.5 \times 10^4$ roentgens per hour and to a total absorption dose of 1 or 2 megarads. These two coatings immediately after irradiation showed the Sward Rocker values tabulated below.

| Sample | Irradiated to 1-megarad dose | Irradiated to 2-megarads dose |
|---|---|---|
| Resin varnish without hexachloroethane | 7 | 10 |
| Resin varnish with hexachloroethane | 13 | 15 |

EXAMPLE 8

70 parts of alkyd resin varnish modified with dehydrated castor oil similar to that used in Example 1 were added with 40 parts of anatase type titanium dioxide and dispersed by a ball mill, followed by the addition of 30 parts of n-butyl etherified melamine-formaldehyde resin varnish similar to that used in Example 1, thereby forming an amino-formaldehyde-alkyd resin enamel.

To 100 parts of resin content in the amino-formaldehyde-alkyd resin enamel were further added 10 parts of hexachloroethane. The two enamel samples were subjected to the irradiation with electron beams under similar conditions to those noted in Example 1, and thereafter checked for their respective Sward Rocker values. The enamel sample without addition of hexachloroethane showed a Sward Rocker value of 7, while the other sample containing hexachloroethane showed the value of 22. Here, it is to be noted that the Sward Rocker value specified for amino-formaldehyde-alkyd resin enamel under JIS K 5652 is 13 as its lower limit.

EXAMPLE 9

70 parts of alkyd resin varnish modified with dehydrated castor oil similar to that used in Example 1 were added with 10 parts of carbon black and dispersed by a roll mill, followed by the addition of 30 parts of n-butyl etherified melamine-formaldehyde resin varnish similar to that used in Example 1, thereby forming an amino-formaldehyde-alkyd resin enamel.

To 100 parts of resin content in the amino-formaldehyde-alkyd resin enamel were further added 10 parts of hexachloroethane. These two enamel samples were applied to suitable substrates and thereafter subjected to irradiation with electron beams under similar conditions to those noted in Example 1. The resulting Sward Rocker value of one sample without hexachloroethane was 5, while that of the other sample with hexachloroethane was 16.

From all of the foregoing examples, the method for curing the various amino-formaldehyde-alkyd resin coating films according to the present invention may be summarized to offer the following advantages:

(1) Amino-formaldehyde-alkyd resin coating films can be cured with a relatively small dose rate of radiations.

(2) The problems of pot life involved in the use of acidic curing reagents as in the conventional methods is eliminated.

(3) Amino-formaldehyde and amino-formaldehyde-alkyd resin blends can be selected in a wider range than hitherto possible with existing heat curing methods.

What is claimed is:

1. A method for accelerating the curing of amino-formaldehyde resin coating films comprising admixing an amino-formaldehyde resin, selected from the group consisting of urea-formaldehyde resins and melamine-formaldehyde resins, with a chlorinated hydrocarbon compatible with or soluble in said amino-formaldehyde resin and thereafter subjecting the mixing to irradiation with ionizing radiations.

2. A method for accelerating the curing of amino-formaldehyde resin coating films comprising blending an amino-formaldehyde resin, selected from the group consisting of urea-formaldehyde resins and melamine-formaldehyde resins, with alkyd resin and pigments, admixing same with a chlorinated hydrocarbon compatible with or soluble in said amino-formaldehyde resin and thereafter subjecting the mixture to irradiation with ionizing radiations.

3. A method for accelerating the curing of amino-formaldehyde resin coating films comprising blending an amino-formaldehyde resin, selected from the group consisting of urea-formaldehyde resins and melamine-formaldehyde resins, with alkyd resin and pigments, admixing same with a chlorinated hydrocarbon, subjecting the mixture to irradiation with ionizing radiation and further subjecting the irradiated mixture to heat treatment.

4. A method for accelerating the curing of amino-formaldehyde resin or amino-formaldehyde-alkyd resin coating films as claimed in claim 1, wherein said chlorinated hydrocarbon is selected from the group consisting of carbon tetrachloride, hexachloroethane, 1,1,2,2-tetrachloroethane, trichloroethylene and benzene hexachloride.

5. A method for accelerating the curing of amino-formaldehyde resin or amino-formaldehyde-alkyd resin coating films as claimed in claim 2, wherein said chlorinated hydrocarbon is selected from the group consisting of carbon tetrachloride, hexachloroethane, 1,1,2,2-tetrachloroethane, trichloroethylene and benzene hexachloride.

6. A method for accelerating the curing of amino-formaldehyde resin or amino-formaldehyde-alkyd resin coating films as claimed in claim 3, wherein said chlorinated hydrocarbon is selected from the group consisting of carbon tetrachloride, hexachloroethane, 1,1,2,2-tetrachloroethane, trichloroethylene and benzene.

References Cited

UNITED STATES PATENTS 3,133,828   5/1964   Slatkin _____ 204—159.19

OTHER REFERENCES

Chapiro, Radiation Chemistry of Polymeric Systems, 1962, pp. 275, 278, 305.

Simonds et al., Handbook of Plastics, 1943, p. 315.

SAMUEL H. BLECH, Primary Examiner

R. B. TURER, Assistant Examiner

U.S. Cl. X.R.

117—93.31; 204—159.19; 260—21, 67.6, 71, 850